US012535761B2

(12) United States Patent
Ono et al.

(10) Patent No.: US 12,535,761 B2

(45) Date of Patent: Jan. 27, 2026

(54) IMAGE FORMING DEVICE CONFIGURED TO CUT SHEET- TYPE MEDIUM AND FORM IMAGE ON CUT MEDIUM

(71) Applicant: BROTHER KOGYO KABUSHIKI KAISHA, Nagoya (JP)

(72) Inventors: Yasuo Ono, Nagoya (JP); Tomoya Oguchi, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 371 days.

(21) Appl. No.: 18/174,412

(22) Filed: Feb. 24, 2023

(65) Prior Publication Data

US 2023/0273563 A1 Aug. 31, 2023

(30) Foreign Application Priority Data

Feb. 28, 2022 (JP) ................................ 2022-030280
Feb. 10, 2023 (JP) ................................ 2023-019445

(51) Int. Cl.
*G03G 15/00* (2006.01)

(52) U.S. Cl.
CPC ......... *G03G 15/652* (2013.01); *G03G 15/607* (2013.01); *G03G 15/6523* (2013.01); *G03G 2215/00025* (2013.01); *G03G 2215/00679* (2013.01)

(58) Field of Classification Search
CPC ............. G03G 15/652; G03G 15/6523; G03G 15/6555
See application file for complete search history.

(56) References Cited

U.S. PATENT DOCUMENTS

2009/0244246 A1 10/2009 Nakamaki et al.
2010/0090396 A1 4/2010 Shinjo et al.
2018/0017901 A1* 1/2018 Kanzawa .......... G03G 15/6567

FOREIGN PATENT DOCUMENTS

JP 2009-234013 A 10/2009
JP 2010-089939 A 4/2010

* cited by examiner

*Primary Examiner* — Walter L Lindsay, Jr.
*Assistant Examiner* — Andrew V Do
(74) *Attorney, Agent, or Firm* — Kenealy Vaidya LLP

(57) ABSTRACT

An image forming device comprises a media container accommodating a sheet-type medium, an image forming engine, a media conveyor configured to convey the sheet-type medium along a conveyance path from the media container to the image forming engine. The media conveyor has a plurality of conveying rollers including a first conveying roller arranged on an upstream side of the image forming engine and a second conveying roller arranged on a downstream side of the image forming engine. The image forming device further comprises a cutter arranged on an upstream side along the conveyance path with respect to the second conveying roller, and a controller. The controller is configured to control the media conveyor in such a manner that the cut sheet-type medium is conveyed and discharged toward outside after a power is on and before first execution of the image forming process.

15 Claims, 5 Drawing Sheets

| FLG1 | | FLG2 | |
|---|---|---|---|
| 0 | 1 | 0 | 1 |
| INSUFFICIENT CONVEYANCE / CONVEYANCE COMPLETED | SUFFICIENT CONVEYANCE | UNCUT / DISHCARGE COMPLETED | CUT COMPLETED |

STANDARD DISCHARGING PROCESS

| No. | CONDITION | | | | PROCESS AT POWER-RESTRATION |
|---|---|---|---|---|---|
| | ON-HEAD SHEET SENSOR 73 | INTERMEDIATE SHEET SENSOR 71 | FLG1 | FLG2 | |
| 1 | OFF | ON | 0 | 0 | C: CONVEY/CUT/DISCHARGE |
| 2 | OFF | ON | 0 | 1 | C: CONVEY/CUT/DISCHARGE |
| 3 | OFF | ON | 1 | 0 | C: CONVEY/CUT/DISCHARGE |
| 4 | OFF | ON | 1 | 1 | A: DISCHARGE |
| 5 | OFF | OFF | 0 | 0 | NONE OF A-C |
| 6 | OFF | OFF | 0 | 1 | NONE OF A-C |
| 7 | OFF | OFF | 1 | 0 | NONE OF A-C |
| 8 | OFF | OFF | 1 | 1 | NONE OF A-C |
| 9 | ON | ON | 0 | 0 | A: DISCHARGE |
| 10 | ON | ON | 0 | 1 | B: CUT/DISCHARGE |
| 11 | ON | ON | 1 | 0 | B: CUT/DISCHARGE |
| 12 | ON | ON | 1 | 1 | A: DISCHARGE |
| 13 | ON | OFF | 0 | 0 | A: DISCHARGE |
| 14 | ON | OFF | 0 | 1 | A: DISCHARGE |
| 15 | ON | OFF | 1 | 0 | A: DISCHARGE |
| 16 | ON | OFF | 1 | 1 | A: DISCHARGE |

FIG. 6

IMAGE FORMING DEVICE CONFIGURED TO CUT SHEET- TYPE MEDIUM AND FORM IMAGE ON CUT MEDIUM

REFERENCE TO RELATED APPLICATIONS

This application claims priority from Japanese Patent Application No. 2023-019445 filed on Feb. 10, 2023, which claims domestic priority from Japanese Patent Application No. 2022-030280 filed on Feb. 28, 2022. The entire contents of the priority applications are incorporated herein by reference.

BACKGROUND ART

The present disclosures relate to an image forming device configured to form images on sheet-type media.

Image forming devices configured to form an image on a sheet-type medium have been known. In such an image forming device, there may be a case where the image forming device is powered off when operating to, for example, form an image on a sheet-type medium, and the sheet-type medium remains on a sheet conveyance path. There is known conventional art disclosing handling of the sheet-type medium remained on the conveyance path on the image forming device is powered on, based on a status of the sheet-type medium when the image forming device was previously turned off. According to one of typical conventional arts, if a roller pair for conveying the sheet-type medium nips a sheet-type medium when the image forming device is powered on, the sheet-type medium remained in the conveyance path is conveyed to a cutter provided to the image forming device. Then, the remained portion of the sheet-type medium is cut by the cutter. In this image forming device, the cutter is located on the most downstream side of the conveying path. Therefore, after the cutter cuts the sheet-type medium, a downstream part of the sheet-type medium with respect to the cutter, which is separated from an upstream part of the sheet-type medium, is discharged outside.

DESCRIPTION

In contrast to the image forming device described above, in an image forming device where the conveyance roller is located downstream of the cutter, if the power is turned off while the sheet-type medium is being conveyed in a direction of ejection toward outside, for example, the separated sheet media may remain in the image forming device even if the sheet media has already been cut.

According to aspects of the present disclosure, there is provided an image forming device comprising a media container configured to accommodate a roll body formed by winding a sheet-type medium in a roll, an image forming engine configured to execute an image forming process of forming an image on the sheet-type medium, a media conveyor configured to convey the sheet-type medium along a conveyance path from the media container to the image forming engine, the media conveyor having a plurality of conveying rollers including a first conveying roller and a second conveying roller, the first conveying roller being arranged on an upstream side along the conveyance path with respect to the image forming engine, the second conveying roller being arranged on a downstream side along the conveyance path with respect to the image forming engine, a cutter configured to cut the sheet-type medium, the cutter being arranged on an upstream side along the conveyance path with respect to the second conveying roller, and a controller. The controller is configured to control the media conveyor in such a manner that the sheet-type medium cut by the cutter is conveyed and discharged toward outside of the image forming device after a power is on and before first execution of the image forming process.

FIG. 1 schematically shows a cross-sectional side view of a printer according to an embodiment of aspects of the present disclosure.

FIG. 2 schematically shows a plan view of the printer.

FIG. 6 is a table illustrating a relationship between conditions that are matched with obtained results by a status obtaining section and a process when the power is restored.

Hereinafter, referring to FIGS. 1-6, a printer 100 according to an embodiment of the present disclosures will be described. In the following description, an up-down direction, a front-rear direction, and a right-left direction indicated in FIG. 1 correspond to an up-down direction, a front-rear direction, and a right-left direction of the printer 100. Is noted that the printer 100 is an example of an image forming device.

Figure 1:
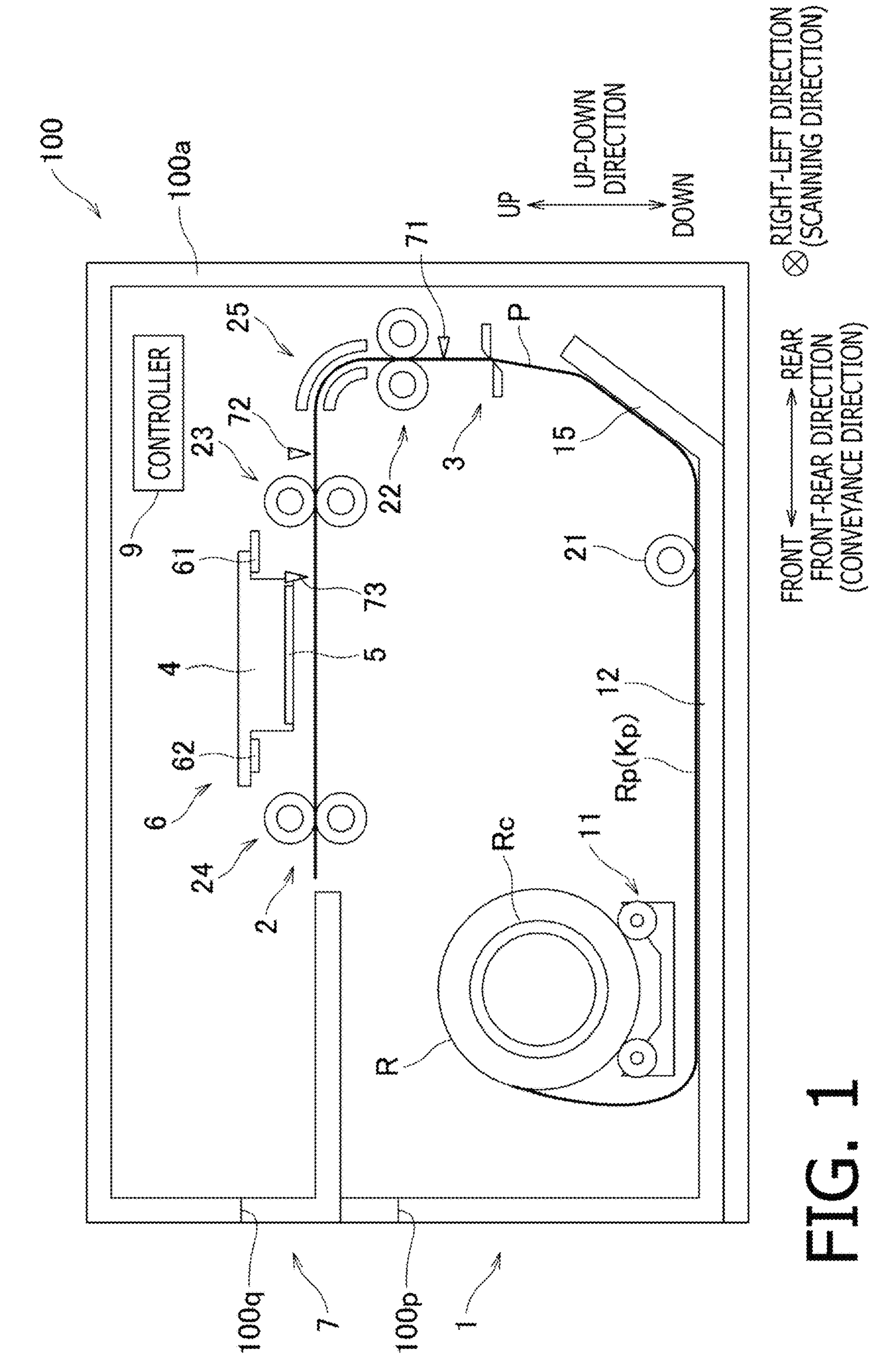
Figure 2:
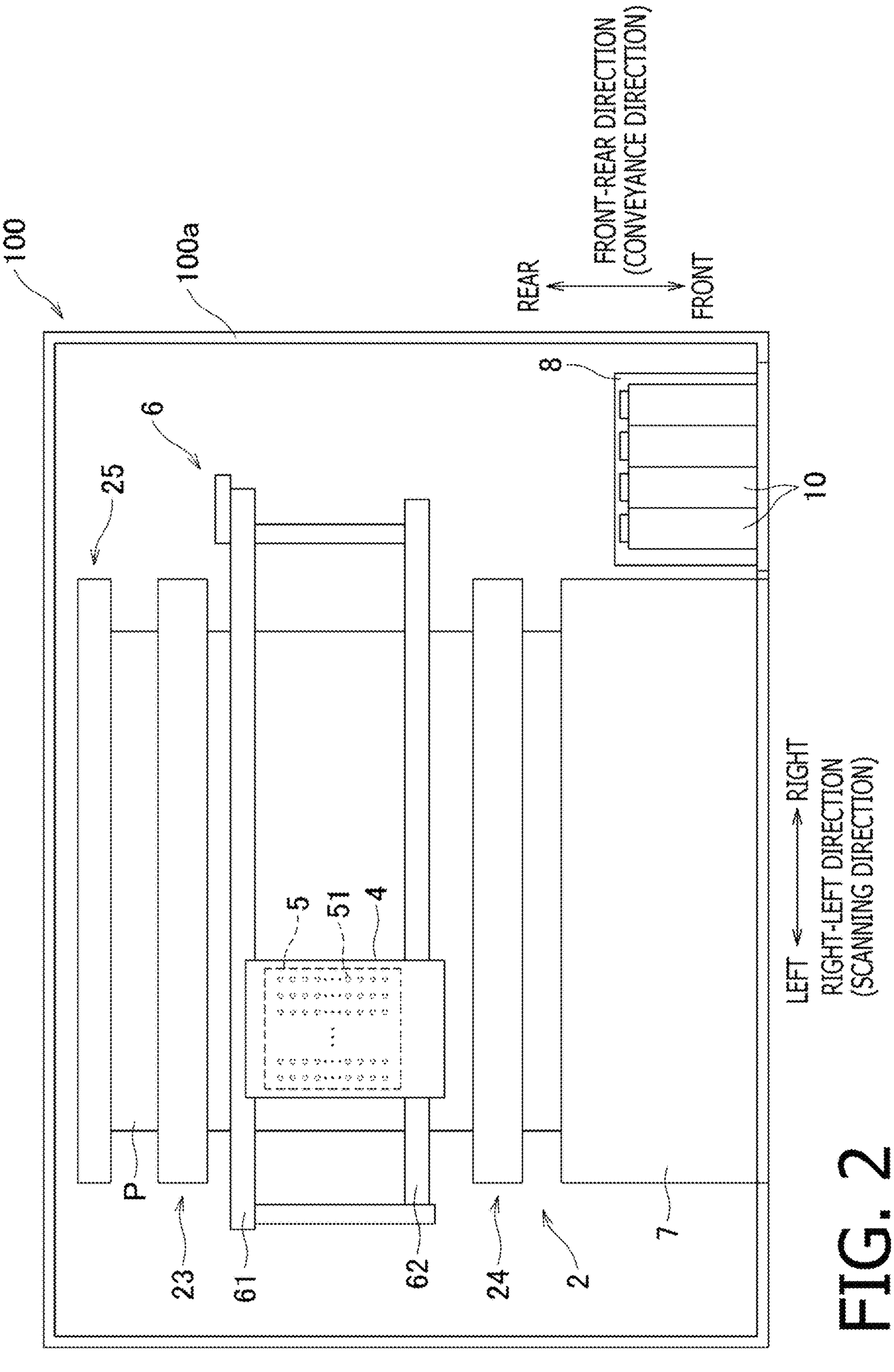

As shown in FIGS. 1 and 2, the printer mainly has a housing 100*a*, a sheet feed tray 1, a conveying mechanism, a cutter 3, a carriage 4, a head 5, a moving mechanism 6, a sheet discharge tray 7, a cartridge mount 8, and a controller 9.

Inside the housing 100*a*, the sheet feed tray 1 is arranged below the head 5. The sheet feed tray 1 is configured to be inserted to and withdrawn from (i.e., along the front-rear direction) the housing 100*a* through an opening 10*p* formed on a front wall of the housing 100*a*. It is noted that the sheet feed tray 1 is an example of a medium container according to aspects of the present disclosures.

The sheet feed tray 1 is configured to accommodate a roll body R and cut sheets Kp. The sheet feed tray 1 may be configured to accommodate a roll body R and the cut sheets Kp, or selectively accommodate one of the roll body R and the cut sheets Kp. The sheet feed tray 1 has a roll body support 11 configured to support the roll body R and a placement surface 12 on which the cut sheets Kp are to be placed.

The roll body R is a long sheet wound around an outer circumference of a cylindrical core member Rc in a form of a roll. The cut sheet Kp is a sheet shorter than the long sheet constituting the roll body R. The cut sheet Kp is a standard size sheet (e.g., A4 size: 210 mm×297 mm, B5 size: 182 mm×257 mm, and the like) which is a short sheet of which length is shorter than the length of the long sheet. It is noted that the maximum size sheet that can be used in the printer 100 according to the present embodiment is the A4 size sheet. The cut sheets Kp are placed on the placement surface 12 in a stacked manner.

The conveying mechanism 2 conveys sheet P along a conveyance path from the sheet feed tray 1 to the sheet discharge tray 7 via the head 5 (i.e., a passage along a thick line indicating the sheet P in FIG. 1). It is noted that, when a roll sheet Rp and cut sheet Kp are not distinguished from each other for the same of description, a term “sheet P” is used. Hereinafter, terms “upstream” and “downstream” are used to indicate upstream and downstream in a conveying direction of the sheet P along the conveyance path of the conveying mechanism 2. The conveying mechanism 2 has a sheet feed roller 21, an intermediate roller pair 22, a conveying roller pair 23, a discharging roller pair 24 and a guiding member 25. It is noted that the sheet feed roller 21, the intermediate roller pair 22, the conveying roller pair 23 and the discharging roller pair 24 are arranged from the upstream side to the downstream side, along the conveyance path, in this order. The conveying mechanism 2 is an example of a media conveyor according to aspects of the present disclosures.

The sheet feed roller 21 feeds the sheet P (i.e., the roll sheet Rp unwound from the roll body R supported by the roll body support 11 or the cut sheet Kp placed on the placement surface 12) from the sheet feed tray 1.

Figure 3:
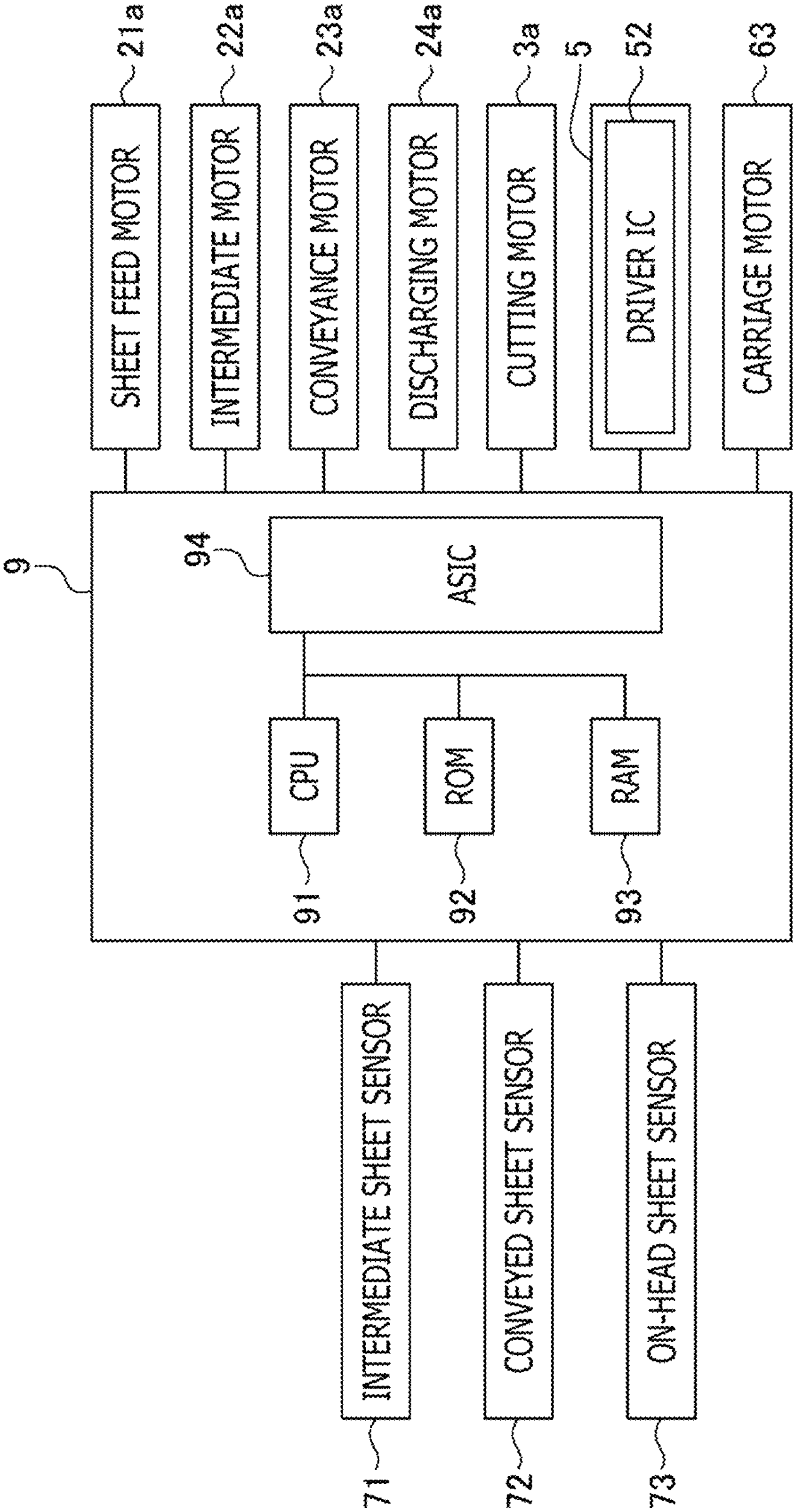
FIG. 3 is a block diagram showing an electric configuration of the printer.

The sheet feed roller 21 rotates by a driving force from the sheet feed motor 21*a* (see FIG. 3). When driven by the controller 9, the sheet feed roller 21 rotates, a conveying force directed from a front side to a rear side is applied to the sheet P contacting the sheet feed roller 21. Then, the sheet P is sent out from the sheet feed tray 1. It is noted that a rear wall 15 provided on a rear edge of the sheet feed tray 1 is inclined in such a manner that an upper end of the rear wall 15 is located slightly on the rear side with respect to the lower end thereof. Therefore, the sheet P fed out from the sheet feed tray 1 proceeds in an obliquely upward direction.

The intermediate roller pair 22 includes a drive roller configured to rotate by a driving force of an intermediate motor 22*a* (see FIG. 3) and a driven roller that follows a rotation of the drive roller. When the intermediate motor 22*a* is driven by the controller 9, the intermediate roller pair nipping the sheet P between the drive roller and the driven roller rotates to feed the sheet P. The intermediate roller pair 22 is arranged above the rear end portion of the sheet feed tray 1. The intermediate roller pair 22 nipping the sheet P, which is fed from the sheet feed tray 1 and directed in the obliquely upward direction, conveys the sheet P further upwardly. The guiding member 25 is arranged above the intermediate roller pair 22. The guiding member 25 guides the sheet, which is conveyed upwardly by the intermediate roller pair 22, to the front side.

An intermediate sheet sensor 71 is arranged in the vicinity, on the upstream side, of the intermediate roller pair 22. The intermediate sheet sensor 71 is configured to detect reaching of a leading end of the sheet P, presence/absence of the sheet P at a position where the intermediate sheet sensor 71 is arranged. The detection result of the intermediate sheet sensor 71 is output to the controller 9. A timing at which the intermediate sheet sensor 71 detects the leading end of the sheet P is adjusted to coincide or substantially coincide with a timing when the leading end of the sheet P reaches the intermediate roller pair 22. The intermediate roller pair 22 is an example of a first conveying roller according to aspects of the present disclosures.

The conveying roller pair 23 includes a drive roller that rotates by the driving force of a conveying motor 23*a* (see FIG. 3) and a drive roller that follows the rotation of the drive roller. The discharging roller pair 24 includes a drive roller that rotates by the driving force of a discharging motor 24*a* (see FIG. 3) and a drive roller that follows the rotation of the drive roller. The conveying roller pair 23 is an example of a first conveying roller according to aspects of the present disclosures. The discharging roller pair 24 is an example of a second conveying roller according to aspects of the present disclosures.

In the vicinity, on the upstream side, of the conveying roller pair 23, a conveyed sheet sensor 72 is provided. The conveyed sheet sensor 72 is configured to detect the reaching of the leading end of the sheet P, the presence/absence of the sheet P at the position where the conveyed sheet sensor 72 is located, and the like. A detection result of the conveyed sheet sensor 72 is output to the controller 9. A timing at which the conveyed sheet sensor 72 detects the leading end of the sheet p is adjusted to coincide with or substantially coincide with a timing at which the leading end of the sheet P reaches the conveying roller pair 23.

When the conveying motor 23*a* and the discharging motor 24*a* are driven by the controller 9, the conveying roller pair 23 and the discharging roller pair 24 rotate, with nipping the sheet P, and convey the sheet P frontward, which is the conveying direction. The conveying roller pair 23 is arranged on the rear side with respect to the head 5, and the discharging roller pair 24 is arranged on the front side with respect to the head 5. The conveying roller pair 23 further conveys the sheet P that is guided, by the guiding member 25, frontward toward the discharging roller pair 24. The discharging roller pair 24 further conveys, with nipping the sheet P conveyed frontward by the conveying roller pair 23, the sheet P frontward and discharge the sheet P on the sheet discharge tray 7.

The cutter 3 is arranged on an upstream side, in the conveyance path, with respect to the intermediate roller pair 22, and a position between the rear end of the sheet feed tray 1 and the intermediate roller pair 22. The cutter 3 has, for example, a disk-shaped rotational blade and a driven blade. The cutter 3 is configured to be driven by a driving force of a cutting motor 3*a* (see FIG. 3), and the rotational blade rotates and the cutter 3 reciprocally moves in the right-left direction. The roll sheet Rp unwound from the roll body R is cut by the cutter 3 along a width direction of the roll sheet Rp as the cutting motor 3*a* is driven by the controller 9. In this way, a trailing end of the roll sheet Rp is formed, and the roll sheet Rp is discharged on the sheet discharge tray 7 as a sheet.

The head 5 has a plurality of nozzles 51 formed on a bottom surface of the head 5 (see FIG. 2) and a driver IC 52 (see FIG. 3). When the driver IC 52 is driven by the controller 9, the ink (i.e., ink droplets) is ejected from the nozzles 51, and the ink (i.e., the ink droplets) forms a dot image on the sheet P. The head 5 is mounted on the carriage 4. The head 5 is an example of an image forming engine according to aspects of the present disclosures.

The moving mechanism 6 has two guide rails 61 and 62, and a carriage motor 63 (see FIG. 3). The two guide rails 61 and 62 are spaced apart from each other in the front-read direction and each extends in the right-left direction. The carriage 4 is arranged to straddle the two guide rails 61 and 62. The carriage 4 is connected to the carriage motor 63 with a belt or the like. When the carriage motor 63 is driven by the controller 9, the carriage 4 moves in a scanning direction (i.e., the right-left direction) along the guide rails 61 and 62.

As mentioned above, the dots are formed in sequence along the scanning direction with the ink (i.e., the ink droplets) ejected by the head 5 as the head 5 moves in the scanning direction along with the movement of the carriage 4. The rows of dots along the scanning direction are formed in sequence as the sheet P is conveyed by the conveying mechanism 2. In an image recording area defined on a sheet P, the dots are aligned in both the scanning and conveying directions, and an image constituted by such an array of dots is formed on the sheet P. The image recording area is a rectangular area according to the size of the image. The above-described operation of forming an image on the sheet P by the head 5 is an example of an image forming operation according to aspects of the present disclosures.

At an upstream end portion of the head 5, an on-head sheet sensor 73 is provided. The position of the on-head sheet sensor 73 corresponds to a position in the vicinity, on the downstream side, of the conveying roller pair 23. The on-head sheet sensor 73 detects the reaching of the leading end of the sheet P, the presence/absence of the sheet P at the position of the on-head sheet sensor 73, and the like. The detection result of the on-head sheet sensor 73 is output to the controller 9. When the leading end of the sheet P has not reached the on-head sheet sensor 73, there is a possibility that the sheet P has not reached the conveying roller pair 23. It is noted that the on-head sheet sensor 73 is an example of a media sensor according to aspects of the present disclosures.

The sheet discharge tray 7 is located, inside the housing 100*a*, in front of the head 5 and above the sheet feed tray 1. The sheet discharge tray 7 is configured to be inserted to and withdrawn from the housing 100*a* via an opening 100*g* formed on the front wall of the housing 100*a*. The sheet P on which an image has been formed by the head 5 is discharged and received by the sheet discharge tray 7.

The cartridge mount 8 is located on one side (i.e., right side) of the sheet discharge tray 7 in the left-right direction and on the front side with respect to the moving mechanism 6 regarding the front-rear direction, as shown in FIG. 2. The cartridge mount 8 is configured such that four ink cartridges 10 respectively storing black, yellow, cyan and magenta ink can be detachably attached thereto. The ink is supplied from the ink cartridges 10 mounted to the cartridge mount 8 to the head 5 through tubes or the like (not shown).

The controller 9 is configured to control overall operations of the printer 100. As shown in FIG. 3, the sheet feed motor 21*a*, the intermediate motor 22*a*, the conveying motor 23*a*, the discharging motor 24*a*, the cutting motor 3*a*, the driver IC 52, the carriage motor 63, the intermediate sheet sensor 71, the conveyed sheet sensor 72 and the on-head sheet sensor 73 are electrically connected to the controller 9.

As shown in FIG. 3, the controller 9 has a CPU 91, a ROM 92, a RAM 93, an ASIC 94 and the like. The ROM 92 stores programs executed by the CPU 91 or the ASIC 94, and variables FLG1 and FLG2 indicating statuses of the sheet P. It is noted that an initial value of each of the variables FLG1 and FLG2 is zero, and each of the variables FLG1 and FLG2 is updated, in an image forming process (described later), to a value indicating the status of the sheet P. The variables FLG1 and FLG2 are maintained in the ROM 92 even if the printer 100 is powered off, and can be referred to after the power of the printer 100 is restored. The RAM 93 is configured to temporarily store data necessary when the programs are executed. It is noted that the ROM 92 is an example of a non-volatile memory according to aspects of the present disclosures.

The controller 9 may be configured such that only the CPU 91 executes all the processes, only the ASIC 94 executes all the processes, or the CPU 91 and the ASIC 94 cooperate to execute the processes. Further, the controller 9 may be configured such that a single CPU 91 executes the processes, or multiple CPU's 91 share the processes. Further, the controller 9 may be configured such that a single ASIC 94 executes the processes, or multiple ASIC's 94 share the processes.

The controller mainly executes the image forming process and a standard discharging process. As functional devices for the above processes, the controller 9 includes a status recording device 101, a status recording device 101, an image formation controller 103 and a sheet discharge controller 104.

It is noted that the image formation controller 103 and the sheet discharge controller 104 are examples of discharging and forming according to aspects of the present disclosures, respectively.

In the image forming process, the image formation controller 103 executes a preparation process of causing the conveying mechanism 2 to convey the sheet P to the vicinity of the head 5. In the preparation process, the reaching of the sheet P to the intermediate roller pair 22, to the conveying roller pair 23 and to the head 5 are sequentially detected by the intermediate sheet sensor 71, the conveyed sheet sensor 72, and the on-head sheet sensor 73, respectively. When the sheet P is the roll sheet Rp, the status recording device 101 changes the value of the variable FLG1 of the ROM 92 to "1" when the on-head sheet sensor 73 detects the leading end of the sheet P.

Next, the image formation controller 103 alternately and repeatedly executes a process of causing the conveying mechanism 2 to repeatedly convey the sheet P by a particular amount along the conveying passage, and a process of causing the moving mechanism 6 to move the carriage 4 in the scanning direction with ejecting the ink to the sheet P through the multiple nozzles 51 of the head 5. When the sheet P is the roll sheet Rp, the roll sheet Rp receives the ink ejected from the head 5 while being conveyed by the conveying mechanism 2. The roll sheet Rp is cut out to have a desired length by the cutter 3 under operation of the image formation controller 103. At a timing when the cutter 3 cuts the roll sheet Rp (i.e., at a timing when the roll sheet Rp is completely cut in a width direction), the status recording device 101 changes the variable FLG2 stored in the ROM 92 to "1." The roll sheet Rp cut by the cutter 3 is discharged onto the sheet discharge tray 7 as a single sheet on which an image has been recorded. At a timing when the roll sheet Rp is discharged onto the sheet discharge tray 7, the status recording device 101 changes each of the variables FLG1 and FLG2 to "0."

When the sheet P is the cut sheet Kp, the cut sheet Kp receives the ink ejected from the head 5 while being conveyed by the conveying mechanism 2. Then, the cut sheet Kp becomes the sheet P on which an image has been recorded and discharged onto the sheet discharge tray 7.

Incidentally, when the printer 100 is unexpectedly turned off during the image forming process because the power plug is unplugged from the outlet or there is a power failure, the sheet P may remain on the conveyance path when the power is next turned on and restored. When the sheet P remained on the conveyance path is the cut sheet Kp, the cut sheet Kp should be conveyed to the sheet discharge tray 7. However, when the sheet P remained on the conveyance path is the roll sheet Rp, the conveying status and the cutting status of the sheet P vary depending on a timing when the printer 100 is powered off.

Figures 4, 5:
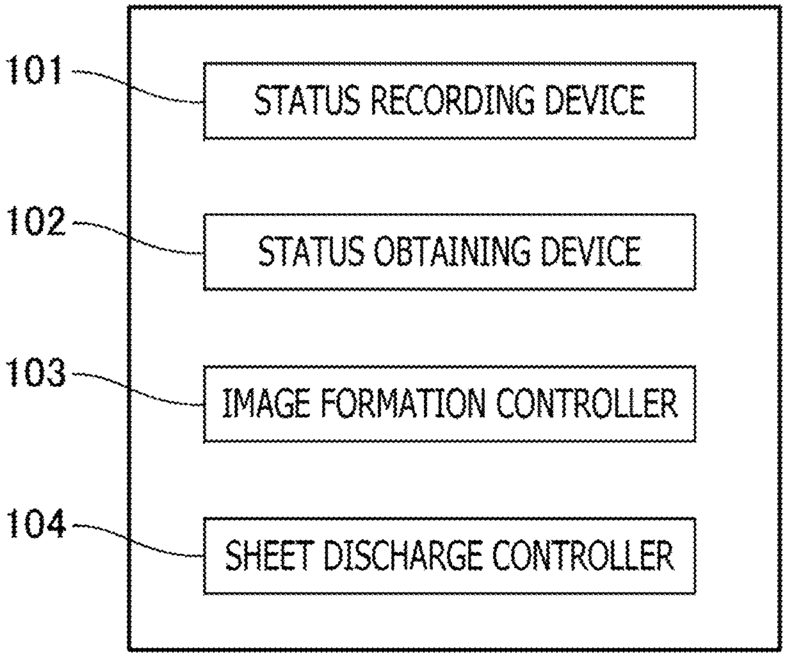
FIG. 4 is a block diagram showing a functional configuration of the printer.
FIG. 5 is a table showing relationships among values of FLG1 and FLG2 and status of a roll sheet when the image forming device is powered off.

The status of the roll sheet Rp on the conveyance path when the power is turned off can be ascertained by referring to the variables FLG1 and FLG2 stored in the ROM 91 at a time when the power is restored. FIG. 5 shows relationships between the variables FLG1 and FLG 2 and the status of the roll sheets Rp. If the variable FLG2 at a time when the power is turned off is "0," the roll sheet Rp has not been cut or has been discharged. If the variable FLG2 at a time when the power is turned off is "1," the roll sheet Rp has been cut but has not been discharged. It is noted that a timing when the variable FLG2 becomes "1" after starting the image forming process is a timing when the roll sheet Rp is completely cut in a width direction. That is, if the power is turned off while the roll sheet Rp is being cut by the cutter 3, the variable FLG2 keeps "0." Therefore, in a case where the power is turned off while the roll sheet Rp is being cut and the rotational blade of the cutter 3 stops in a middle of the roll sheet Rp in the width direction, the variable FLG2 will indicate that the roll sheet Rp is uncut. If the variable FLG1 at a time when the power is turned off is "1," the leading end of the roll sheet Rp has reached the on-head sheet sensor 73. In this case, since the roll sheet Rp has already reached the conveying roller pair 23, when the roll sheet Rp has been cut (i.e., FLG2=1), the conveying mechanism 2 is caused to convey the roll sheet Rp as is to discharge on the sheet discharge tray. When the roll sheet Rp has not been cut (i.e., FLG2=0), the roll sheet Rp is discharged onto the sheet discharge tray 7 after being cut. That is, the roll sheet Rp was in a sufficient conveying status for discharge when the power was turned off. On the other hand, if the variable FLG1 is "0" when the power is turned off, opposite to the above, the roll sheet Rp was in an insufficient conveying status for discharge or the discharge of the roll sheet Rp, which had been cut, has been completed. It is noted that the roll sheet Rp remained on the conveyance path is an example of an on-path sheet-type medium according to aspects of the present disclosures.

Regardless of the various statuses at the time of power off, if the process of conveying and cutting the roll sheet Rp is normally performed after the power is restored, there is a possibility of wasteful processing or failure to properly discharge the roll sheet Rp.

Therefore, after the power is restored and before the first image forming process is executed, the status obtaining device 102 and the sheet discharge controller 104 execute the following processes. First, the status obtaining device 102 obtains the values of FLG1 and FLG2 in ROM 92 as the status of the roll sheet Rp when the power is turned off, and the detection results of both the intermediate sheet sensor 71 and the on-head sheet sensor 73 as the status of the roll sheet Rp after power is restored. Then, the sheet discharge controller 104 checks the results of the status of the roll sheet Rp obtained by the status obtaining device 102 against the conditions shown in FIG. 6, and executes each of the processes shown in FIG. 6. FIG. 6 shows the relationship between the conditions under which the obtained results by the status obtaining device 102 are collated and the process when the power is restored.

The "ON" and "OFF" in FIG. 6 respectively correspond to the detection and non-detection of the presence of the roll sheet Rp by the intermediate sheet sensor 71 or the on-head sheet sensor 73. There are 16 patterns (i.e., No. 1-No. 16) of processes at the time of power supply restoration. Among these 16 patterns, No. 1, 11, 12, and 16 correspond to a standard discharging process, which is a process performed in a case where the roll sheet Rp remains on the conveyor path when the power is turned off and the power is restored without changing the status of the roll sheet Rp.

The standard discharging process includes three types of processes A-C. The process A is a process to have the conveying mechanism 2 convey the roll sheet Rp along the conveying passage as it is and discharge the same to the sheet discharge tray 7. The process B is a process to have the cutter 3 cut the roll sheet Rp on the conveyance path, and then have the conveying mechanism 2 discharge the same to the sheet discharge tray 7. The process C is a process to have the conveying mechanism 2 convey the roll sheet Rp on the conveying passage until the leading end is detected by the on-head sheet sensor 73, then have the cutter 3 cut the roll sheet Rp, and then have the conveying mechanism 2 discharge the roll sheet Rp to the sheet discharge tray 7. It is noted that the process A is an examples of first discharging according to aspects of the present disclosures, the process B is an examples of second discharging according to aspects of the present disclosures, and the process C is an examples of third discharging according to aspects of the present disclosures.

In the standard discharging processes, the No. 1 condition is that only the intermediate sheet sensor 71 is ON and the others are OFF or have a value of 0. In this condition, the roll sheet Rp on the conveyance path is in inadequate conveyance status and uncut. Therefore, the process C (i.e., to convey, cut and discharge) is executed. The No. 11 condition is that only the variable FLG2 is 0 and the others are ON or have a value of 1. In this condition, the roll sheet Rp on the conveyance path is in the sufficiently conveyed status but uncut. Therefore, the process B (i.e., to cut and discharge) is executed. The No. 12 condition is that all elements are either ON or have a value of 1. In this case, the roll sheet Rp on the conveyance path is fully conveyed and has been cut. Therefore, the process A (i.e., to discharge) is executed. The No. 16 condition is that only the intermediate sheet sensor 71 is OFF, and the other elements are either ON or have a value of 1. In this condition, it is assumed that the roll sheet Rp on the conveyance path has already been cut, but the power was turned off while the sheet was being discharged in the image forming process. Therefore, the process A (i.e., to discharge) is executed.

Each of the conditions in No. 1, 11, 12 and 16 in the standard discharging process, as shown in FIG. 6, satisfies the following conditions. First, at least one of the intermediate sheet sensor 71 and the on-head sheet sensor 73 is ON. This corresponds to the presence of the roll sheet Rp on the conveyance path when the power is restored. Second, the detection result of the on-head sheet sensor 73 and the value of the variable FLG1 coincide with each other when the power is restored. That is, the value of the variable FLG1 is 1 if the detection result of the on-head sheet sensor 73 is ON when power is restored, and the value of the variable FLG1 is 0 if the detection result of the on-head sheet sensor 73 is OFF when power is restored. This indicates that there is a high probability that the roll sheet Rp exists in the vicinity of the conveying roller pair 23 when the power is turned off, and that the status is maintained until the power is restored. Third, the conditions for the variables FLG1 and FLG2 are other than combinations where the value of the variable FLG1 is 0 and the value of the variable FLG2 is 1. The fact that the variable FLG1 is 0 and the variable FLG2 is 1 indicates that there is a high probability that the software has a bug. By excluding such combinations, cases in which software bugs are present are excluded from the conditions of the standard discharging process.

The processes listed in Table 6, processes other than the standard discharging process, are as follows. In the processes of No. 2 to 4, 6 to 10, 13 and 14, the following situations were assumed from the conditions of each process: a bug exists in the software, the user manually unwound or removed the roll sheet Rp, only a part of the roll sheet Rp remained after the discharging, the image forming process of cut sheet Kp was in progress at a time when the power was turned off, or the like are assumed from the conditions in each process. In any of the processes, the content is selected according to the conditions and assumed situations, i.e., either the corresponding one of the processes A to C is executed or none of the processes A to C are executed.

The No. 5 condition is that all elements are either OFF or have a value of 0. Therefore, it is assumed that the image forming process has been completed up to the sheet discharge. Therefore, none of processes A through C are executed. The No. 15 condition is that the conveyed sheet sensor 72 is ON, the value of the variable FLG1 is 1, and the other elements are OFF or have a value of 0. That is, the roll sheet Rp on the conveyance path is not cut but on the downstream side with respect to the intermediate sheet sensor 71. This state is assumed to be a state in which the power is turned off when all the roll sheet Rp in the roll body R of the sheet feed tray 1 has been unwound and conveyed downstream from the intermediate sheet sensor 71 without being cut by the cutter 3. Thus, the process C (i.e., the discharging) is executed.

According to the embodiment described above, when the power is turned off and if the roll sheet Rp on the conveyance path is in a position where the roll sheet Rp is dischargeable and has already been cut (in the No. 12 case or No. 16 case in FIG. 6), the roll sheet Rp is discharged as it is (i.e., the process A). When the power is turned off and if the roll sheet Rp on the conveyance path is in a position where the roll sheet Rp is dischargeable but has not been cut (No. 11 of FIG. 6), the roll sheet Rp is cut and then discharged (i.e., the process B). Furthermore, when the power is turned off and the roll sheet Rp on the conveyance path is not in a position where the roll sheet Rp is dischargeable and has not been cut (No. 1 in FIG. 6), the roll sheet Rp is conveyed to the position where the roll sheet Rp is dischargeable, cut, and then discharged (i.e., the process C).

As described above, the intermediate roller pair 22, the conveying roller pair 23 and the discharging roller pair 24 are located at the downstream side of the cutter 3. Therefore, even if the roll sheet Rp has been cut by the cutter 3 when the power is turned, these roller pairs may be in the process of conveying the roll sheet Rp. Thus, the roll sheet Rp is likely to remain on the conveying path. According to aspects of the present disclosures, even if the roll sheet Rp remains the conveying path when the power is turned off, the standard discharging process is performed at the subsequent power-on to eject the roll sheet Rp on the conveying path to the sheet discharge tray 7 before the the first image forming operation is performed. With this configuration, the roll sheet Rp is unlikely to remain on the conveying path after the power is restored. It is noted that the roll sheet Rp ejected to the paper ejection tray 7 is removed by the user to the outside of the printer 1. In this sense, ejecting the roll sheet Rp on the conveyance path to the sheet discharge tray 7 is equivalent to ejecting the roll sheet Rp toward the outside of the printer 1.

According to aspects of the present disclosures, even if the roll sheet Rp is present on the conveyance path when the power is turned off, at the subsequent power-on, an appropriate process is selected according to whether or not the roll sheet Rp is in a position where it can be discharged and whether or not the roll sheet Rp has been cut. Therefore, unnecessary operations on the roll sheet Rp on the conveyance path can be suppressed. For example, it is suppressed that the roll sheet Rp is fed unnecessarily or that the cutting operation is performed unnecessarily even though the roll sheet Rp has already been cut. Further, it is also suppressed that the roll sheet Rp remains in the conveyance path and hinders the subsequent conveyance.

In the present embodiment, the value of the variable FLG1 is changed to 1 based on the detection result of the on-head sheet sensor 73 arranged in the vicinity of the conveying roller pair 23. Whether or not the roll of paper Rp is located at a dischargeable position depends on whether or not the roll sheet Rp has reached the vicinity of the conveying roller pair 23. Therefore, by having the on-head sheet sensor 73 detect whether or not the roll sheet Rp has reached the conveying roller pair 23 and updating the variable FLG1 based on the detection result, the FLG1 value appropriately reflects whether or not the roll sheet Rp was located at a dischargeable position when the power was turned off.

Furthermore, according to the present embodiment, in each of the No. 1, 11, 12, and 16 processes in FIG. 6, which are part of the standard discharging process, the detection result of the on-head sheet sensor 73 and the value of the variable FLG1 coincide with each other. In other words, only in a case where the detection result of the on-head sheet sensor 73 at the power-off time and the detection result of the on-head sheet sensor 73 at the power-restoration coincide with each other, the process according to the condition of whether the conveyance in the standard discharging process is sufficient or not is executed. Thus, the certainty of the process according to the condition of whether or not the conveyance is sufficient in the standard discharging process is improved. It is noted that the processes described above correspond to "in a case where detection result of the media sensor at a time when the power is off and detection result of the media sensor at a time when the power is on from a state where the power is off coincide with each other, the controller is configured to obtain, in the obtaining, the information indicating the status whether the on-path sheet-type medium is located at the dischargeable position based on the detection result of the media sensor" according to aspects of the present disclosures.

Furthermore, in the present embodiment, as shown in FIG. 6, not only the variables FLG1 and FLG2, which indicate the status of roll sheet Rp when the power is turned off, but also the detection results of the intermediate sheet sensor 71 and the on-head sheet sensor 73 after the power is restored, separation between the standard discharging process and other processes is made. For example, if the detection result of the on-head sheet sensor 73 after the power is restored does not match the value of the variable FLG1, or if the combination of the values of the variables FLG1 and FLG2 is inappropriate, it is assumed that an exceptional situation has occurred, such as the user manually removing the roll sheet Rp or a bug in the software. In such a case, as shown in FIG. 6, the standard discharging process (No. 1, 11, 12 and 16) is not performed. (No. 1, 11, 12, and 16) and other processes (No. 2 through 10 and 13 through 15) according to the conditions and assumed situations, thereby eliminating unnecessary operations.

Further, according to the embodiment described above, the cutter 3 is located at the upstream side of the head 5. Such a configuration is more convenient in the following points compared to the configuration in which the cutter 3 is located downstream side of the head 5. That is, in the latter configuration, in order to perform the next image forming process after the roll sheet Rp is cut by the cutter 3, the roll sheet Rp located at the upstream side of the cutter 3 has to be once rewound to the roll body R. In contrast, according to the former configuration, after the roll sheet Rp has been cut by the cutter 3, the next image forming process is able to be performed without rewinding the roll sheet Rp located at the upstream side of the cutter 3 to the roll body R. This is similar even when the power is turned off during the image forming process. Unlike the latter configuration, the former configuration does not require the roll sheet Rp located at the upstream side of the cutter 3 to be rewound to the roll body R.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, in the embodiment described above, the value of the FLG1 is updated based on the detection result of the on-head sheet sensor 73. However, the value of the variable FLG1 may be updated based on the detection result of the conveyed sheet sensor 72. In such a case, even if roll sheet Rp is detected by the conveyed sheet sensor 72 located upstream of the conveying roller pair 23, there is a possibility that the roll sheet Rp has not reached the conveying roller pair 23.

However, even if cutter 3 cuts the roll sheet Rp in such a state, if the distance from the cutting position of cutter 3 to the intermediate roller pair 22 is less than the distance from the conveyed sheet sensor 72 to the conveying roller pair 23, the intermediate roller pair 22 can convey the roll sheet Rp to reach the conveying roller pair 23. Therefore, it is then possible to have the conveying roller pair and the discharging roller pair 24 convey the roll sheet Rp and discharge the roll sheet Rp on the sheet discharge tray 7. Additionally, in such a case, the various processes in the standard discharging process may be executed according to whether or not the detection result of the conveyed sheet sensor 72 after the power is restored matches the value of the variable FLG1.

In the above embodiment, the value of the variable FLG1 is updated by the status recording device 101 based on the detection result of the on-head sheet sensor 73. It is noted that the value of the variable FLG1 may be updated according to other methods. For example, a rotary encoder may be installed in the intermediate roller pair 22 or the conveying roller pair 23, and the value of the variable FLG1 is updated based on the amount of the roll sheet Rp fed by the roller pair which is detected by the rotary encoder. During the image forming process, when it is detected that the leading end of the roll sheet Rp has reached the conveying roller pair 23 based on the detection result of the rotary encoder, the value of the variable FLG1 may be changed to 1. The point of time when it is detected that the leading end of the roll sheet Rp has reached the conveying roller pair 23 corresponds, for example, to a point of time when the amount of roll sheet Rp fed by the intermediate roller pair 22 reaches a particular amount after it is detected by intermediate sheet sensor 71 that the leading end of the roll sheet Rp has reached the intermediate sheet sensor 71.

In the embodiment described above, the conveying mechanism 2 has the intermediate roller pair 22, but the intermediate roller pair 22 may be omitted. The intermediate roller pair 22 serves to relay the conveyance of the sheet P between the sheet feed roller 21 and the conveying roller pair 23. If the distance between the sheet feed roller 21 and the conveying roller pair 23 is relatively small, the intermediate roller pair 22 is less necessary. In contrast, for example, when there is another tray below the head 5 and above the sheet feed tray 1 for holding other media for image forming, such as cut sheets Kp or the like, and the distance between the sheet feed roller 21 and the conveying roller pair 23 may be relatively large, the need for the intermediate roller pair 22 increases.

In the embodiment described above, if the roll sheet Rp on the conveyance path is in an insufficiently conveyed state when the power is turned off (e.g., No. 1 in FIG. 6), the process C (i.e., to convey, cut, and discharge the sheet) is executed after the power is restored and before the first image forming process is executed. Alternatively, the roll sheet Rp remaining on the conveyance path may be used for image formation in the first image formation process after the power is restored. It is noted that the processes of this embodiment correspond to third discharging according to aspects of the present disclosures.

In the embodiment described above, as shown in FIG. 6, each process of the standard discharging process is executed based on the variables FLG1 and FLG2 stored in the ROM 92. Alternatively or optionally, each process of the standard discharging process may be executed based on the detection results of sensors that detect the conveyance status and/or cutting status of the roll sheet Rp on the conveyance path. For example, an optical sensor, which is configured to detect whether or not the roll sheet Rp is cut by detecting whether or not a trailing end of the roll sheet Rp is formed, may be installed in the vicinity of the conveyance path, and each process of the standard discharging process may be executed based on the detection result indicating whether or not the roll sheet Rp on the conveyance path is cut when the power is restored may be executed. The rear end of the roll sheet Rp may be detected by processing an image which is obtained by capturing the roll sheet Rp with the image sensor.

In the embodiment described above, as a process before the first image forming process is executed, one of the processes A to C, etc., according to the status of the roll sheet Rp on the conveyance path is executed based on the values of FLG1 and FLG2 in ROM 92 and the detection results of the intermediate paper sensor 71 and on-head sheet sensor 73. However, if the roll sheet Rp on the conveyance path is discharged to the sheet discharge tray 7 by the conveying mechanism 2, as a process before the first image forming process is executed after the power is restored, processes different from the above embodiment may be performed.

As an example, the following process may always be performed regardless of the status of the roll sheet Rp on the conveyance path. That is, after the power is restored, the roll sheet Rp on the conveyance path may be conveyed to the conveying mechanism 2 until the tip of the roll sheet Rp is detected by the on-head sheet sensor 73 and then may be cut by the cutter 3, and then the roll sheet Rp may be conveyed by the conveying mechanism 2 and discharged to the sheet discharge tray 7.

As another example, regardless of the position of the roll sheet Rp on the conveyance path, after the power is restored, processing may be executed only according to the status of whether or not the paper has been cut as indicated by FLG2. For example, after a particular amount of the roll sheet Rp has been conveyed by the conveying mechanism 2 regardless of the position of the roll sheet Rp on the conveyance path, the roll sheet Rp is cut by the cutter 3 if the roll sheet Rp is uncut, and the cut roll sheet Rp is discharged into the sheet discharge tray 7 by the conveying mechanism 2. On the other hand, if the roll sheet Rp has already been cut after the particular amount of the roll sheet Rp has been conveyed, the roll sheet Rp is discharged to the sheet discharge tray 7 by the conveying mechanism 2 without being cut by the cutter 3.

As further another example, processes may be executed only according to the position of the roll sheet Rp on the conveyance path, regardless of the FLG2 value. For example, if it is determined, based on the detection result of the on-head sheet sensor 73, that the roll sheet Rp on the conveyance path is located on an upstream side of the head 5 at the time of power off, the roll sheet Rp on the conveyance path is conveyed to the conveying mechanism 2 until its tip is detected by the on-head sheet sensor 73, and then cut by the cutter 3 and discharged to the sheet discharge tray 7. On the other hand, based on the detection result of the on-head sheet sensor 73, when the roll sheet Rp on the conveyance path is downstream from the head 5 at the time of power-off, the roll sheet Rp is cut by the cutter 3 without not conveyed by the conveying mechanism 2 and, then conveyed by the conveying mechanism 2 and discharged to the sheet discharge tray 7. The above process may always be executed regardless of the FLG2 value. The above process may always be executed regardless of the FLG2 value. In the above process, when the tip of the roll sheet Rp has not yet reached the on-head sheet sensor 73, it is determined that the roll sheet Rp on the conveyance path is located on the upstream side of the head 5. Ehen the tip of the roll sheet Rp has already reached the on-head sheet sensor 73, it is determined that the roll sheet Rp on the conveyance path is located on the downstream side of the head 5.

In the above embodiment, the cutter 3 is located upstream of head 5. In contrast, the cutter 3 may be located downstream from head 5. In this case, as in the above embodiment, when the roller that conveys the roll sheet Rp is located downstream from the cutter 3, this roller conveys the roll sheet Rp cut by the cutter 3 to the paper exit tray 7. Therefore, even if roll sheet Rp has already been cut by cutter 3 when the power is turned off, the power is turned off before roll sheet Rp is discharged to the sheet discharge tray 7, and the roll sheet Rp may remain on the conveyance path. Therefore, when the power is restored, the roll sheet Rp on the conveyance path is discharged by the rollers to the paper discharge tray 7, which prevents the roll sheet Rp from remaining on the conveyance path.

The status obtaining unit 102 of the embodiment described above obtains the respective values of FLG1 and FLG2 in ROM 92 and the detection results of the intermediate paper sensor 71 and the on-head sheet sensor 73 as the status of the roll sheet Rp. In contrast, the status of the roll sheet Rp may be obtained based on the extent to which, at the time of the power is turned off, image formation performed by ejecting ink from head 5 onto the sheet P in the image forming process had progressed in the processing of image data subject to image formation. For example, the image formation controller 103 records in the ROM 92 progress data indicating the degree of progress in the processing of the image data for image formation. The progress data is updated as appropriate as the image forming process progresses. After the power is restored, based on the progress data recorded in ROM 92, a position where the roll sheet Rp is conveyed when the power was turned off and whether or not the sheet is cut by the cutter 3 may be estimated.

In the embodiment and modifications described above, aspects of the present disclosures are applied to the printer 100. However, the application of the present disclosures is not necessarily limited to the printer 100, but expanded to an MFP, a copier and the like. The disclosure may be applied to an image forming device that performs the image recording process according to an electrophotographic image forming method instead of the inkjet method.

What is claimed is:

1. An image forming device, comprising:

a media container configured to accommodate a roll body formed by winding a sheet-type medium in a roll;

an image forming engine configured to form an image on the sheet-type medium;

a media conveyor configured to convey the sheet-type medium along a conveyance path from the media container to the image forming engine, the media conveyor having a plurality of conveying rollers including a first conveying roller and a second conveying roller, the first conveying roller being arranged on an upstream side along the conveyance path with respect to the image forming engine, the second conveying roller being arranged on a downstream side along the conveyance path with respect to the image forming engine;

a cutter configured to cut the sheet-type medium, the cutter being arranged on an upstream side along the conveyance path with respect to the second conveying roller;

a media sensor configured to detect the sheet-type medium; and a controller, wherein the media conveyor and the image forming engine are configured to execute an image forming process by the media conveyor conveying the sheet-type medium from the media container and the image forming engine forming the image on the sheet-type medium conveyed by the media conveyor, wherein the media sensor is configured to detect the sheet-type medium in the conveyance path in response to the image forming device being powered on, and wherein, when the media sensor detects the sheet-type medium in the conveyance path in response to the image forming device being powered on, the controller is configured to control the media conveyor in such a manner that the sheet-type medium detected by the media sensor and cut by the cutter is conveyed and discharged toward outside of the image forming device after the image forming device is powered on and before the media conveyor and the image forming engine start first execution of the image forming process.

2. The image forming device according to claim 1, wherein the cutter is arranged on an upstream side along the conveyance path with respect to the image forming engine.

3. The image forming device according to claim 1, wherein the controller is further configured to perform:

obtaining a status of an on-path sheet-type medium after the power is on and before the first execution of the image forming process, the on-path sheet-type medium being the sheet-type medium located on the conveyance path; and causing the media conveyor to discharge the on-path sheet-type medium toward outside of the image forming device according to the obtained status of the on-path sheet-type medium.

4. The image forming device according to claim 3, wherein, in the obtaining, the controller obtains, as the status of the on-path sheet-type medium, whether the on-path sheet-type medium has been cut by the cutter, and wherein the controller is further configured to perform: when the on-path sheet-type medium has been cut by the cutter, not causing the cutter to cut the on-path sheet-type medium; and when the on-path sheet-type medium has not been cut by the cutter, causing the cutter to cut the on-path sheet-type medium.

5. The image forming device according to claim 4, wherein, in the obtaining, the controller obtains, as the status of the on-path sheet-type medium, a position of the on-path sheet-type medium, wherein the controller is further configured to perform causing the media conveyor to discharge the on-path sheet-type medium according to the position of the on-path sheet-type medium.

6. The image forming device according to claim 5, wherein the discharging the on-path sheet-type medium includes:

first discharging of causing the media conveyor to convey the on-path sheet-type medium toward outside of the image forming device before first execution of the image forming process when the on-path sheet-type medium having been cut;

second discharging of causing the cutter to cut the on-path sheet-type medium and causing the media conveyor to discharge the on-path sheet-type medium toward outside of the image forming device before first execution of the image forming process when there exists the on-path sheet-type medium that is uncut and located at a dischargeable position dischargeable by the plurality of conveying rollers; and third discharging of causing the media conveyor to convey the on-path sheet-type medium to the dischargeable position, causing the cutter to cut the on-path sheet-type medium, and causing the media conveyor to further convey the sheet-type medium toward outside of the image forming device when the on-path sheet-type medium is uncut and not located at the dischargeable position.

7. The image forming device according to claim 3, wherein, in the obtaining, the controller obtains, as the status of the on-path sheet-type medium, a position of the on-path sheet-type medium, wherein the controller is further configured to perform causing the media conveyor to discharge the on-path sheet-type medium according to the position of the on-path sheet-type medium.

8. The image forming device according to claim 7, wherein, in the obtaining, the controller obtains, as the status of the on-path sheet-type medium, a position of a tip of the on-path sheet-type medium, wherein the controller is further configured to perform: causing the media conveyor to convey the on-path sheet-type medium to the dischargeable position dischargeable by the plurality of conveying rollers, causing the cutter to cut the on-path sheet-type medium, and causing the media conveyor to convey the on-path sheet-type medium toward outside of the image forming device when the tip of the on-path sheet-type medium is located at an upstream side with respect to the image forming engine in the conveyance path; and causing the cutter to cut the on-path sheet-type medium before causing the media conveyor to convey the on-path sheet-type medium, and causing the media conveyor to convey the cut on-path sheet-type medium toward outside of the image forming device when the tip of the on-path sheet-type medium is located at a downstream side with respect to the image forming engine in the conveyance path.

9. The image forming device according to claim 3, further comprising a non-volatile memory, wherein the controller is further configured to perform storing data indicating a status of the on-path sheet-type medium in the non-volatile memory, and wherein, in the obtaining, the controller is configured to obtain the data indicating the status of the on-path sheet-type medium from the non-volatile memory before first execution of the image forming process.

10. The image forming device according to claim 9, further comprising a media sensor configured to detect whether the on-path sheet-type medium exists in vicinity of each of at least one of the plurality of conveying rollers, wherein the controller is configured to determine whether to perform the discharging based on the data stored in the non-volatile memory by the storing and the detection result by the media sensor after the power is on and before first execution of the image forming process.

11. The image forming device according to claim 1, wherein the media sensor is further configured to detect whether the on-path sheet-type medium exists in vicinity of each of at least one of the plurality of conveying rollers, wherein, in the obtaining, the controller is configured to obtain the information indicating the status whether the on-path sheet-type medium is located at a dischargeable position dischargeable by the plurality of conveying rollers based on detection result by the media sensor.

12. The image forming device according to claim 11, wherein the media sensor is configured to detect whether the sheet-type medium exists in vicinity of a closest roller, the closest roller being a conveying roller, among the plurality of conveying rollers, located at a closest position to the image forming engine at an upstream side with respect to the image forming engine in the conveyance path, and wherein, in the obtaining, the controller is configured to obtain the information indicating the status whether the on-path sheet-type medium is located at the dischargeable position based on whether the sheet-type medium exists in vicinity of the closest roller.

13. The image forming device according to claim 12, wherein, in a case where detection result of the media sensor at a time when the power is off and detection result of the media sensor at a time when the power is on from a state where the power is off coincide with each other, the controller is configured to obtain, in the obtaining, the information indicating the status whether the on-path sheet-type medium is located at the dischargeable position based on the detection result of the media sensor.

14. An image forming device, comprising:

a media container configured to accommodate a roll body formed by winding a sheet-type medium in a roll;

an image forming engine configured to execute an image forming process of forming an image on the sheet-type medium;

a media conveyor configured to convey the sheet-type medium along a conveyance path from the media container to the image forming engine, the media conveyor having a plurality of conveying rollers including a first conveying roller and a second conveying roller, the first conveying roller being arranged on an upstream side along the conveyance path with respect to the image forming engine, the second conveying roller being arranged on a downstream side along the conveyance path with respect to the image forming engine;

a cutter configured to cut the sheet-type medium, the cutter being arranged on an upstream side along the conveyance path with respect to the second conveying roller;

a controller, wherein the controller is configured to control the media conveyor in such a manner that the sheet-type medium cut by the cutter is conveyed and discharged toward outside of the image forming device after a power is on and before first execution of the image forming process;

wherein the controller is further configured to perform:

obtaining a status of an on-path sheet-type medium after the power is on and before the first execution of the image forming process, the on-path sheet-type medium being the sheet-type medium located on the conveyance path; and causing the media conveyor to discharge the on-path sheet-type medium toward outside of the image forming device according to the obtained status of the on-path sheet-type medium;

wherein, in the obtaining, the controller obtains, as the status of the on-path sheet-type medium, whether the on-path sheet-type medium has been cut by the cutter, and wherein the controller is further configured to perform:

when the on-path sheet-type medium has been cut by the cutter, not causing the cutter to cut the on-path sheet-type medium; and when the on-path sheet-type medium has not been cut by the cutter, causing the cutter to cut the on-path sheet-type medium.

15. An image forming device, comprising:

a media container configured to accommodate a roll body formed by winding a sheet-type medium in a roll;

an image forming engine configured to execute an image forming process of forming an image on the sheet-type medium;

a media conveyor configured to convey the sheet-type medium along a conveyance path from the media container to the image forming engine, the media conveyor having a plurality of conveying rollers including a first conveying roller and a second conveying roller, the first conveying roller being arranged on an upstream side along the conveyance path with respect to the image forming engine, the second conveying roller being arranged on a downstream side along the conveyance path with respect to the image forming engine;

a cutter configured to cut the sheet-type medium, the cutter being arranged on an upstream side along the conveyance path with respect to the second conveying roller;

a controller, wherein the controller is configured to control the media conveyor in such a manner that the sheet-type medium cut by the cutter is conveyed and discharged toward outside of the image forming device after a power is on and before first execution of the image forming process;

a media sensor configured to detect whether the on-path sheet-type medium exists in vicinity of each of at least one of the plurality of conveying rollers, wherein, in the obtaining, the controller is configured to obtain the information indicating the status whether the on-path sheet-type medium is located at a dischargeable position dischargeable by the plurality of conveying rollers based on detection result by the media sensor;

wherein the media sensor is configured to detect whether the sheet-type medium exists in vicinity of a closest roller, the closest roller being a conveying roller, among the plurality of conveying rollers, located at a closest position to the image forming engine at a upstream side with respect to the image forming engine in the conveyance path, and wherein, in the obtaining, the controller is configured to obtain the information indicating the status whether the on-path sheet-type medium is located at the dischargeable position based on whether the sheet-type medium exists in vicinity of the closest roller;

wherein, in a case where detection result of the media sensor at a time when the power is off and detection result of the media sensor at a time when the power is on from a state where the power is off coincide with each other, the controller is configured to obtain, in the obtaining, the information indicating the status whether the on-path sheet-type medium is located at the dischargeable position based on the detection result of the media sensor.

* * * * *